(12) United States Patent
Elliott et al.

(10) Patent No.: US 7,774,650 B2
(45) Date of Patent: Aug. 10, 2010

(54) POWER FAILURE WARNING IN LOGICALLY PARTITIONED ENCLOSURES

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/625,945

(22) Filed: Jan. 23, 2007

(65) Prior Publication Data

US 2008/0178049 A1    Jul. 24, 2008

(51) Int. Cl.
*G06F 11/00* (2006.01)
*G06F 1/30* (2006.01)

(52) U.S. Cl. .......................... 714/24; 714/22; 713/340
(58) Field of Classification Search ................ 714/22, 714/24; 713/300, 310, 321, 324, 340
See application file for complete search history.

(56) References Cited

U.S. PATENT DOCUMENTS

| | | | |
|---|---|---|---|
| 4,458,307 A | 7/1984 | McAnlis et al. | |
| 5,596,708 A | 1/1997 | Weber | |
| 5,835,780 A * | 11/1998 | Osaki et al. ................. | 713/300 |
| 6,195,754 B1 | 2/2001 | Jardine et al. | |
| 6,535,996 B1 | 3/2003 | Brewer et al. | |
| 6,668,991 B2 | 12/2003 | Canaday et al. | |
| 6,988,222 B2 | 1/2006 | Sparer | |
| 7,131,013 B2 * | 10/2006 | Sasakura et al. ............. | 713/300 |
| 7,131,019 B2 * | 10/2006 | Lee ............................. | 713/340 |
| 7,148,695 B2 * | 12/2006 | Swope et al. ................ | 324/522 |
| 7,152,175 B2 * | 12/2006 | Madany et al. .............. | 713/340 |
| 7,275,182 B2 * | 9/2007 | Egan et al. ................... | 714/22 |
| 7,337,357 B2 * | 2/2008 | Cagno et al. ................ | 714/14 |
| 7,380,088 B2 * | 5/2008 | Wang et al. ................. | 711/170 |
| 7,406,623 B2 * | 7/2008 | Takahashi et al. ........... | 714/14 |
| 7,444,483 B2 * | 10/2008 | Taguchi et al. .............. | 711/156 |
| 7,584,378 B2 * | 9/2009 | Elliott et al. ................. | 714/5 |
| 7,669,071 B2 * | 2/2010 | Cochran et al. ............. | 713/340 |
| 2002/0099753 A1 * | 7/2002 | Hardin et al. ................ | 709/1 |
| 2002/0124194 A1 * | 9/2002 | Dawkins et al. ............. | 713/310 |
| 2005/0040809 A1 | 2/2005 | Uber, III et al. | |
| 2007/0038819 A1 * | 2/2007 | Miki et al. ................... | 711/154 |
| 2007/0043965 A1 * | 2/2007 | Mandelblat et al. ......... | 713/324 |
| 2007/0061441 A1 * | 3/2007 | Landis et al. ................ | 709/224 |
| 2007/0266265 A1 * | 11/2007 | Zmudzinski et al. ......... | 713/300 |
| 2008/0098194 A1 * | 4/2008 | Hashimoto et al. .......... | 711/173 |
| 2008/0114999 A1 * | 5/2008 | Terry et al. .................. | 713/340 |
| 2008/0133902 A1 * | 6/2008 | Love ........................... | 713/2 |

OTHER PUBLICATIONS

IBM Technical Disclosure Bulletin, NN9606235 published Jun. 1, 1996.*

* cited by examiner

*Primary Examiner*—Scott T Baderman
*Assistant Examiner*—Joseph Schell
(74) *Attorney, Agent, or Firm*—Griffiths & Seaton PLLC

(57) ABSTRACT

A method of providing a power failure warning in a storage system includes partitioning early power off warning (EPOW) control logic of a storage enclosure to be symmetric with a power distribution network power domain. A power failure warning system for a storage system having a plurality of storage enclosures includes a power system control module coupled to a power supply for control and management of input power to the storage system. An output stage of the power supply is dedicated to a first virtual storage enclosure within one of the plurality of storage enclosures.

18 Claims, 4 Drawing Sheets

POWER FAILURE WARNING IN LOGICALLY PARTITIONED ENCLOSURES

BACKGROUND OF THE INVENTION

1. Field of the Invention

The present invention relates in general to computers, and, more particularly, to an apparatus and method of implementing a power failure warning in logically partitioned enclosures in a storage system.

2. Description of the Prior Art

Data storage systems are used to store information provided by one or more host computer systems. Such data storage systems receive requests to write information to a plurality of data storage devices and requests to retrieve information from that plurality of data storage devices. It is known in the art to configure the plurality of data storage devices into two or more storage arrays.

Storage enclosures which are incorporated into data storage systems (disk enclosures configured in a just-a-bunch-of-disks [JBOD] or switched-bunch-of-disks [SBOD] and the like) have traditionally been implemented with a single set of physical resources treated as a single instance of an enclosure with all shared resources controlled by a common single enclosure services process/instance. Most vendor components to manage storage enclosures have been developed with consideration to the number of hard disk drive (HDD) devices that will be within a single enclosure package. Most original equipment manufacturer (OEM) storage enclosure implementations have a legacy of products that conform to this convention.

To improve the storage density (i.e., the number of HDDs packaged per Electronics Industry Association (EIA) standard unit in a single storage enclosure), high-density packaging techniques can be used to increase the number of HDDs within a given volume of space. Once the number of HDDs moves beyond the number that traditional enclosures and enclosure management components are designed for, new components and new storage enclosure configurations must be designed to meet the demand for increased HDD density. As such, new development of enclosure management services software and HDD communication fabric management code is required to be developed at significant design, development, and verification expense.

SUMMARY OF THE INVENTION

In light of the foregoing, a need exists for a computer-implemented method and apparatus for providing a power failure warning in storage systems. The apparatus and method should incorporate existing system resources and constraints, so as to provide an efficient, cost-effective and minimally invasive solution.

In one embodiment, the present invention is a method of providing a power failure warning in a storage system, comprising partitioning early power off warning (EPOW) control logic of a storage enclosure to be symmetric with a power distribution network power domain.

In another embodiment, the present invention is a power failure warning system for a storage system having a plurality of storage enclosures, comprising a power system control module coupled to a power supply for control and management of input power to the storage system, wherein an output stage of the power supply is dedicated to a first virtual storage enclosure within one of the plurality of storage enclosures.

In another embodiment, the present invention is a computer program product comprising a computer usable medium having computer usable program code for providing a power failure warning in a storage system, the computer program product including computer usable program code for partitioning early power off warning (EPOW) control logic of a storage enclosure to be symmetric with a power distribution network power domain.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
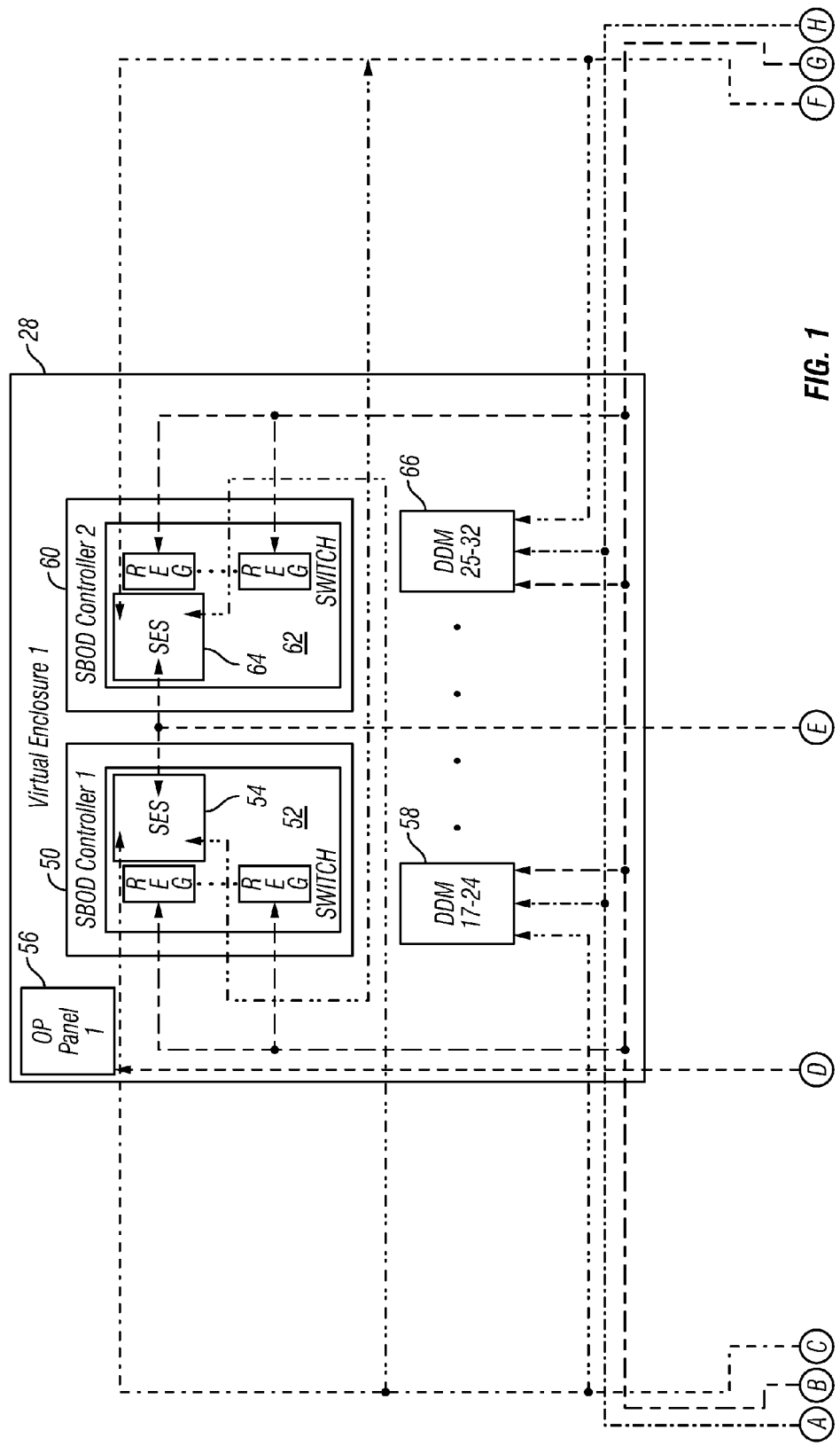
FIG. 1 illustrates a logically partitioned enclosure for implementing aspects of the present invention.
Figure 1:
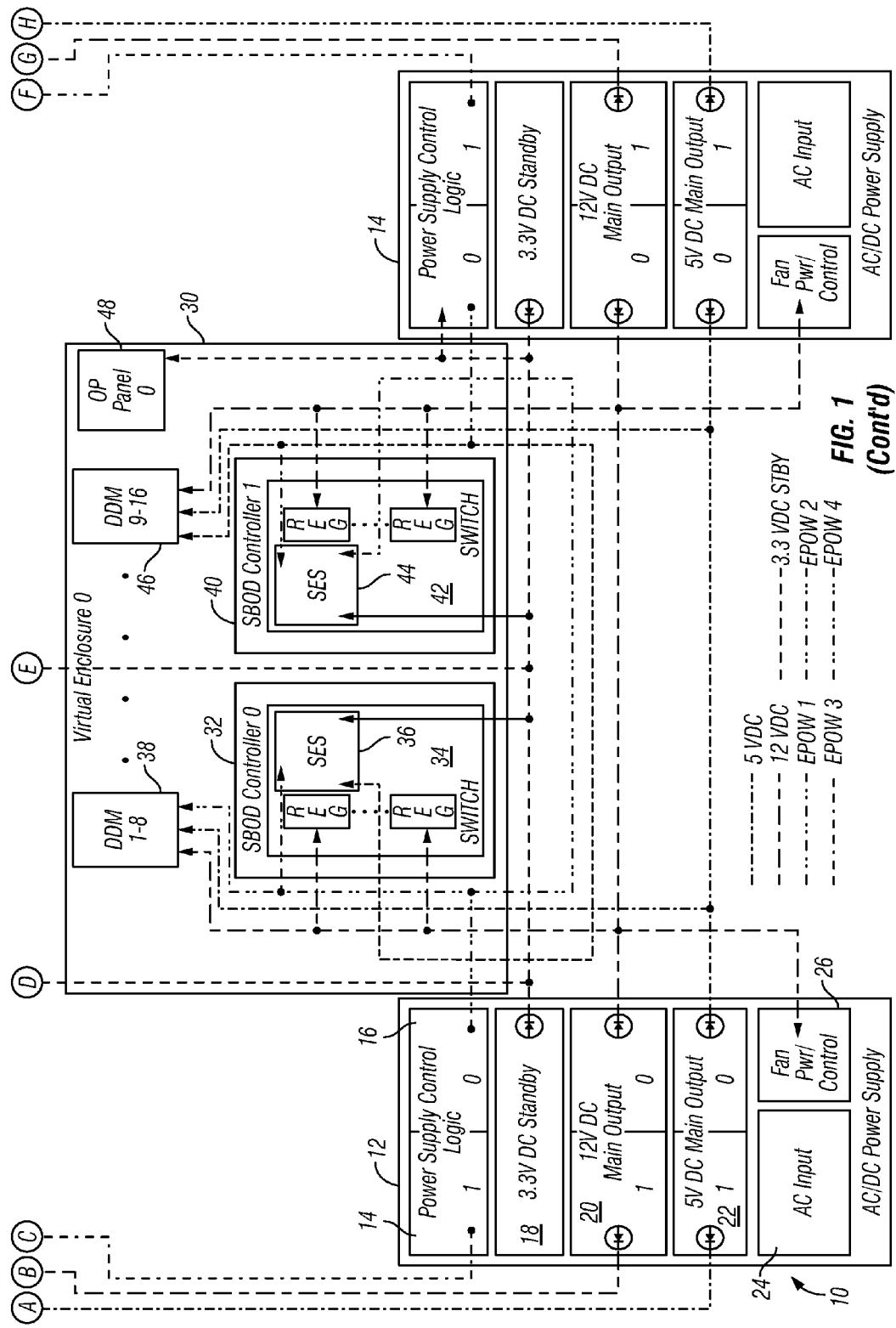

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In traditional enclosure environments, the power system reports the state of an impending power loss by sensing a loss of input power and provides a reserve of energy for the system to draw from for a specified period of time. Prior art methods treat the entire system as a single boundary/entity with respect to the power distribution network. The present invention implements a system and method of partitioning the Early Power OFF Warning (EPOW) control logic of the enclosure to be symmetric with the power distribution network power domains. When partitioned in this manner, the EPOW control logic more accurately reflects the state/status of the power control and distribution of the enclosure as it applies to each virtual storage enclosure that is partitioned within the enclosure.

The power system control apparatus can be implemented such that output stages of the power supplies are partitioned to each virtual storage enclosure within the enclosure. As a result, control and management of the power for each virtual enclosure is equivalent to that of a single instance of an enclosure. The present invention implements monitoring and control logic for an impending power loss detection and reporting system (EPOW) in a manner that allows detection of the loss of input power and the loss of power of an output power from a stage of a power supply. Configuring the EPOW reporting system to attribute the detection of a loss of an output stage of a power supply to a virtual enclosure allows the EPOW reporting system to protect the storage system from several power loss scenarios not covered by conventional prior art implementations.

The following is a description taken from the SFF Committee SFF-SFF Committee SFF-8045 Specification for 40-pin SCA-2 Connector w/Parallel Selection Rev 4.5 Jul. 23, 2001, for describing the expected behavior for a loss of power to fibre channel arbitrated loop (FC-AL) disk drives:

6.4.8.2 Power Failure Warning (PFW)

The PFW function is optional for the drive and backplane. If supported the drive shall detect a transition to the PFW code from any other code within 2 msecs of being asserted by the backpanel. Upon detecting the PFW value, the drive waits at least 1 usec to deskew the value before accepting it as a valid PFW. The enclosure shall provide full power to the drive for a minimum of 4 msecs from assertion of the PFW code value.

When the drive detects the assertion of the PFW code it shall take the following actions:
a) The drive shall disable both ports gracefully at a frame boundary.
b) If Write Caching is enabled:
the drive shall write as much of the data to nonvolatile storage as possible, and
the drive shall stop writing data to nonvolatile storage on a block boundary.
c) If Write Caching is disabled, the drive shall stop writing data to nonvolatile storage on a block boundary.

If the value on the DEV_CTRL_CODE signals changes to another value after PFW is detected, the drive shall complete the required actions above and wait 1 sec before accepting the new value as valid. After the validation period, the drive shall perform the equivalent of a power-on-reset.

Given this behavior, the lack of a PFW/EPOW signal delivered to system hard disk drives (HDDs) when required may result in the undetected corruption of a block sector of an HDD that creates an unrecoverable data loss.

Another possible outcome based on the power system distribution network architecture, power supply design, and EPOW management and reporting logic is that an erroneous EPOW could be received which would result in the HDDs executing the above referenced actions making the HDDs unavailable, thus resulting in a loss of access event. This could result from a failure of a single output stage of a power supply (that supplies power to a virtual storage enclosure) and a subsequent failure (loss of input power to the redundant power supplies or a failure of the redundant power supply).

The present invention implements a system and method which delivers an EPOW to system HDDs when required and/or ensures a valid EPOW is delivered. In a scenario where a loss of access event occurs in a system configured according to the present invention, one of the virtual enclosures could lose all power but the surviving virtual enclosures could remain powered and all of the HDDs in the surviving virtual enclosures should remain available to the HDD controller.

Turning to FIG. 1, a logically partitioned enclosure of a storage system in accordance with the present invention is depicted. In the configuration 10, several aspects of the present invention are implemented as will be described. An AC/DC power supply 12 is shown including embedded power supply control logic blocks 14 and 16, 3.3V DC standby block 18, 12V DC main output blocks 20, 5V DC main output blocks 22, AC input block 24, fan/power control block 26.

A first, so-called "virtual enclosure" 28 in accordance with the present invention is depicted, as well as a second enclosure 30. Enclosure 30 includes various storage subcomponents which have been organized according to the enclosure 30. The storage subcomponents are organized in a switched-bunch-of-disks topology (SBOD). In addition, the present invention contemplates implementations for storage subcomponents organized in a just-a-bunch-of-disks (JBOD) topology or other topologies.

As would be expected, the various SBOD subcomponents include an SBOD controller 32, a switch 34, a small computer system interface (SCSI) enclosure services (SES) controller 36, and a set of disk drive modules (DDM) 38. A second switch 42, small computer system interface (SCSI) enclosure services (SES) controller 44, and a set of disk drive modules (DDM) 46, as well as a first operations panel 48 make up the virtual enclosure 30. In a similar manner, subcomponents, 50, 52, 54, 56, 58, 60, 62, 64, and 66 make up the virtual enclosure 28.

As shown, the configuration 10 includes various signal bearing mediums, such as voltage signals (e.g., 5V DC, 12V DC, and 3.3 V DC standby signals), and early power off warning (EPOW) signal bearing mediums as depicted. As shown, the output stages of the power supplies 12 and 14 are logically partitioned according to the present invention to each virtual enclosure 28 and 30. As a result, control and management of the power for each virtual enclosure 28 and 30 is equivalent to that of a single instance of an enclosure.

Figure 2:
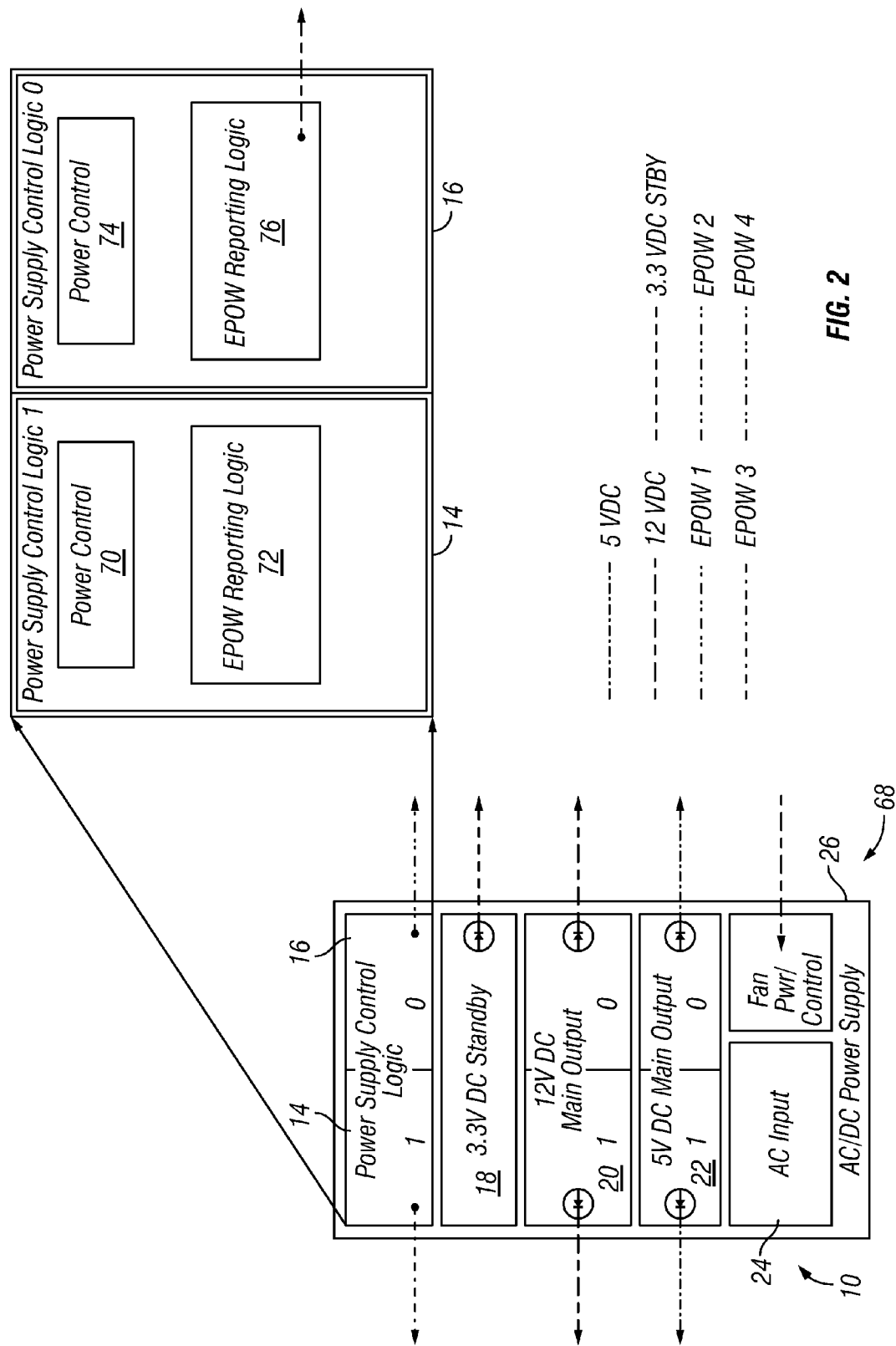
FIG. 2 illustrates an example power system control module in accordance with the present invention.

FIG. 2 illustrates a conceptual view 68 of the AC/DC power supply 12 shown in FIG. 1 to depict the implementation of example early power off warning (EPOW) reporting logic integrated into the power supply control logic blocks 14 and 16. Logic blocks 14 and 16 include power control modules 70 and 74 which can control various power operations. In addition, EPOW reporting logic 72 and 76 is shown integrated into logic blocks 14 and 16, respectively.

Control blocks 14 and 16 can include integrated hardware, software, firmware, or a combination of hardware, software, and firmware to perform various aspects of the present invention, including detection of a loss of input power or a detection of a loss of an output stage of the power supply 12. EPOW reporting logic blocks 72 and 76 can implement and execute notification signals according to a predetermined schedule. The notifications can be sent to a processing component which is internal to the storage system or external to the storage system. The processing component can be responsible for an operation of the storage system, such as power control. For example, the processing component can be integrated into power control module 70, among other locations.

Figure 3:
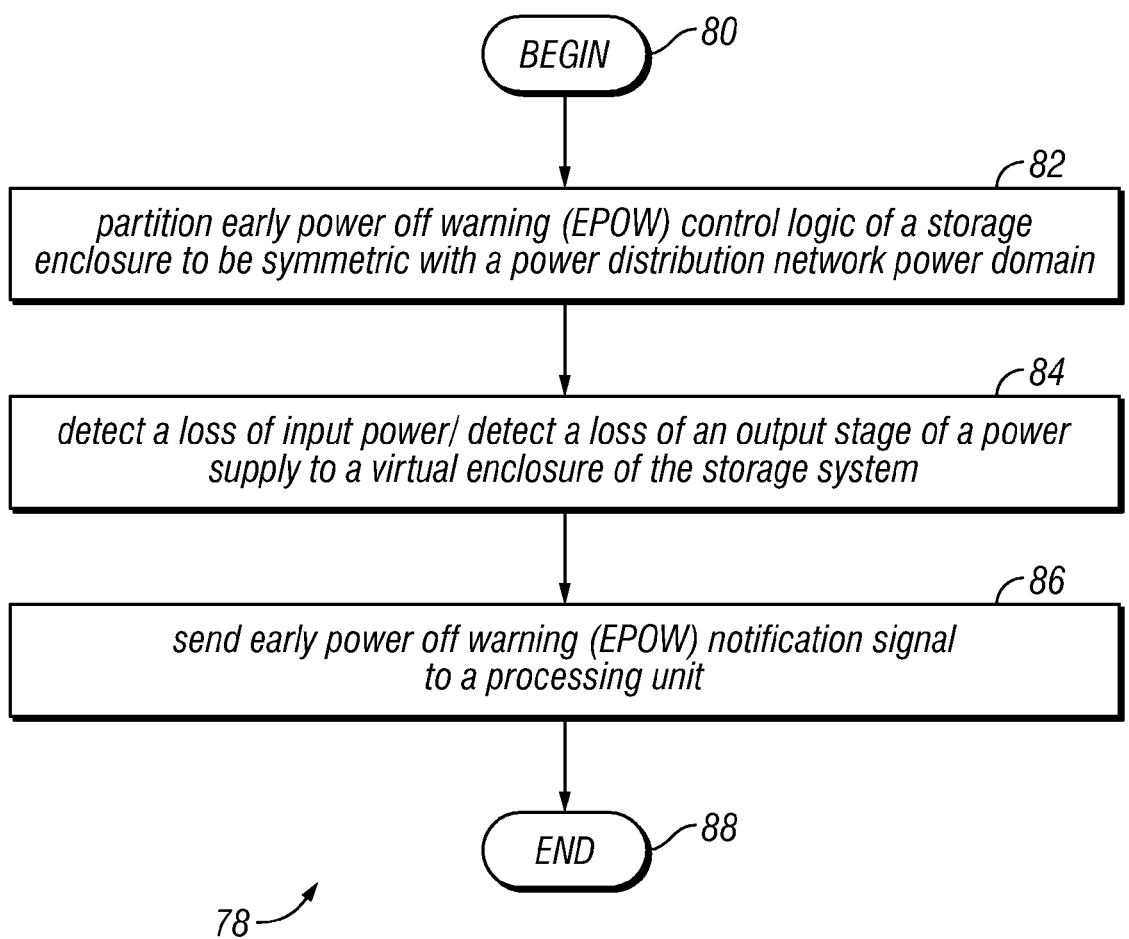
FIG. 3 illustrates an example method for implementing aspects of the present invention.

Turning to FIG. 3, an example method 78 of implementing a power failure warning apparatus and system is described according to the present invention. The method 78 begins (step 80) by logically partitioning early power off warning (EPOW) control logic of a respective storage enclosure to be symmetric with a power distribution network power domain, as previously described (step 82). As a next step, a loss of input power, or a loss of an output stage of a power supply to a designated "virtual enclosure" of the storage system is detected (step 84). An early power off warning (EPOW) notification signal can be sent to a processing unit responsible for an operation of the storage system (step 86). The method 78 then ends (step 88).

Software and/or hardware to implement the method 78 previously described, such as the described sending an EPOW notification signal to a processing unit, can be created using tools currently known in the art. Implementation of the described system and method involves no significant additional expenditure of resources or additional hardware than what is already in use in standard computing environments, which makes the implementation cost-effective.

Implementing and utilizing the example apparatus and method as described can provide a simple, effective method of providing a power failure warning in computer storage systems as described, and serves to maximize the performance of the computer storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of providing a power failure warning in a data storage system, comprising:
    partitioning a first early power off warning (EPOW) control logic for a first disk storage enclosure and a second disk storage enclosure of the data storage system to be symmetric with a first power distribution network power domain for the first and second disk storage enclosures; and
    partitioning a second EPOW control logic for the first and second disk storage enclosures to be symmetric with a second power distribution network domain for the first and second disk storage enclosures.

2. The method of claim 1, further comprising detecting a first loss of input power to the first power distribution network power domain by the first EPOW control logic or detecting a second loss of input power to the second power distribution network power domain by the second EPOW control logic.

3. The method of claim 1, further comprising detecting a loss of a first output stage of the first power distribution network power domain to a first virtual enclosure within the first disk storage enclosure by the first EPOW control logic or detecting a loss of a second output stage of the second power distribution network power domain to a second virtual enclosure within the second disk storage enclosure by the second EPOW control logic.

4. The method of claim 3, further comprising sending an EPOW notification signal to a processing unit responsible for an operation of the data storage system by the first EPOW control logic or the second EPOW logic in response to detecting the loss of the first output stage or the loss of the second output stage, respectively, the notification signal compliant with EPOW control logic.

5. The method of claim 1, wherein the first disk storage enclosure and the second disk storage enclosure are each configured in a just-a-bunch-of-disks (JBOD) topology or a switched-bunch-of-disks (SBOD) topology.

6. The method of claim 1, wherein partitioning the first EPOW control logic comprises:
    dedicating a first output stage of a first power supply to a first virtual storage enclosure within the first disk storage enclosure, and
    dedicating a second output stage of the first power supply to a second virtual storage enclosure within the second disk storage enclosure; and
    wherein partitioning the second EPOW control logic comprises:
        dedicating a third output stage of a second power supply to the first virtual storage enclosure, and
        dedicating a fourth output stage of the second power supply to the second virtual storage enclosure.

7. The method of claim 2, further comprising sending an EPOW notification signal to a processing unit responsible for an operation of the data storage system by the first EPOW control logic or the second EPOW logic in response to detecting the first loss of input power or the second loss of input power, respectively, the notification signal compliant with EPOW control logic.

8. A computer program product comprising:
a computer usable storage medium having computer usable program code for providing a power failure warning in a data storage system, the computer program product including:
computer usable program code for partitioning a first early power off warning (EPOW) control logic of a first disk storage enclosure and a second disk storage enclosure of the data storage system to be symmetric with a first power distribution network power domain for the first and second disk storage enclosures; and
computer usable program code for partitioning a second EPOW control logic of the first and second disk storage enclosures to be symmetric with a second power distribution network domain for the first and second disk storage enclosures.

9. The computer program product of claim 8, further comprising:
computer usable program code for detecting a first loss of input power to the first power distribution network power domain by the first EPOW control logic; and
computer usable program code for detecting a second loss of input power to the second power distribution network power domain by the second EPOW control logic.

10. The computer program product of claim 9, further comprising:
computer usable program code for sending a first EPOW notification signal to a processing unit responsible for an operation of the data storage system by the first EPOW control logic in response to detecting the first loss of input power; and
computer program code for sending a second EPOW notification signal to the processing unit by the second EPOW logic in response to detecting the second loss of input power.

11. The computer program product of claim 8, further comprising:
computer usable program code for detecting a first loss of a first output stage of the first power distribution network power domain to a first virtual enclosure within the first disk storage enclosure by the first EPOW control logic; and
computer usable program code for detecting a second loss of a second output stage of the second power distribution network power domain to a second virtual enclosure within the second disk storage enclosure by the second EPOW control logic.

12. The computer program product of claim 11, further comprising computer usable program code for sending an EPOW notification signal to a processing unit responsible for an operation of the data storage system by the first EPOW control logic or the second EPOW logic in response to detecting the first loss or the second loss, respectively, the notification signal compliant with the EPOW control logic.

13. The computer program product of claim 8, wherein the first disk storage enclosure and the second disk storage enclosure are each configured in a just-a-bunch-of-disks (JBOD) topology or a switched-bunch-of-disks (SBOD) topology.

14. A power failure warning system for a data storage system having a plurality of virtual storage enclosures within a disk storage enclosure, comprising:
a first virtual storage enclosure comprising a first set of storage components and a second set of storage components;
a second virtual storage enclosure comprising a third set of storage components and a fourth set of storage components;
a first power supply comprising:
a first power output including a first power partition coupled to the first and second sets of storage components and a second power partition coupled to the third and fourth sets of storage components, and
a first power supply control logic including a first partition coupled to the first and second sets of storage components and a second partition coupled to the third and fourth sets of storage components; and
a second power supply comprising:
a second power output including a third power partition coupled to the first and second sets of storage components and a fourth power partition coupled to the third and fourth sets of storage components, and
a second power supply control logic including a third partition coupled to the first and second sets of storage components and a fourth partition coupled to the third and fourth sets of storage components.

15. The power failure warning system of claim 14, wherein the first and second power supply control logics are each adapted to detect a loss of input power.

16. The power failure warning system of claim 14, wherein the the first and second power supply control logics are each adapted to detect a loss in the first and second power outputs, respectively.

17. The power failure warning system of claim 14, further comprising a processing unit responsible for an operation of the data storage system coupled to the first and second power supply control logics, wherein the first and second power supply control logics are each configured to transmit an early power off warning (EPOW) notification signal to the processing unit, the notification signal compliant with an early power off warning (EPOW) control logic.

18. The power failure warning system of claim 14, wherein the first and second virtual storage enclosures are configured in a just-a-bunch-of-disks (JBOD) topology or a switched-bunch-of-disks (SBOD) topology.

* * * * *